United States Patent
Kleine Jäger et al.

(10) Patent No.: US 8,119,097 B2
(45) Date of Patent: Feb. 21, 2012

(54) METHOD FOR PRODUCING NANOPARTICULATE SOLID MATERIALS

(75) Inventors: Frank Kleine Jäger, Bad Duerkheim (DE); Julian Proelss, Worms (DE)

(73) Assignee: BASF Aktiengesellschaft, Ludwigshafen (DE)

(*) Notice: Subject to any disclaimer, the term of this patent is extended or adjusted under 35 U.S.C. 154(b) by 982 days.

(21) Appl. No.: 11/815,162

(22) PCT Filed: Jan. 24, 2006

(86) PCT No.: PCT/EP2006/050423
§ 371 (c)(1), (2), (4) Date: Jul. 31, 2007

(87) PCT Pub. No.: WO2006/079633
PCT Pub. Date: Aug. 3, 2006

(65) Prior Publication Data
US 2008/0152583 A1    Jun. 26, 2008

(30) Foreign Application Priority Data
Jan. 31, 2005 (EP) ................. 05001910

(51) Int. Cl.
*C01G 49/02* (2006.01)
(52) U.S. Cl. .................................. 423/633
(58) Field of Classification Search ............. 423/625, 423/610, 633, 624, 622, 263, 594.17, 594.19, 423/604, 607
See application file for complete search history.

(56) References Cited

U.S. PATENT DOCUMENTS

| | | | |
|---|---|---|---|
| 3,365,274 A | 1/1968 | Carpenter et al. | |
| 4,012,201 A * | 3/1977 | Powell et al. | 422/151 |
| 2002/0047110 A1 | 4/2002 | Takao et al. | |
| 2003/0044342 A1 | 3/2003 | Alford et al. | |
| 2004/0050207 A1 | 3/2004 | Wooldridge et al. | |
| 2004/0156986 A1 | 8/2004 | Yadav | |

FOREIGN PATENT DOCUMENTS

| | | |
|---|---|---|
| DE | 199 39 951 | 3/2001 |
| DE | 102 43 307 | 3/2004 |
| EP | 1 004 545 | 5/2000 |
| JP | 61 031325 | 2/1986 |
| WO | 95 01532 | 1/1995 |

OTHER PUBLICATIONS

Dittmeyer, et al., "Neue Technologien" Wiley-VCH Verlag, vol. 2, Capter 9, pp. 821-905, 2004.
Wawrzinek, "Untersuchungen Zur Prozessfuehrung und Stabilisierung exothermer Hoch-temperaturprozesse in poroesen Medien Fuer Anwendungen in der Chemischen Reaktions technik", VDI progress reports, series 3, No. 785, 2003.
Pickenaecker, "Emissionsarme Kompakte Gasheizsysteme auf der Basis stabilisierter Verbrennung in poroesen Medien", VDI progress reports, series 6, No. 445, pp. 1-3 and 138-141, 2001.
Guenther, "Verbrennung und Feuerungen", Springer-Verlag Berlin . Heidelberg, pp. 67-73, 1974.

* cited by examiner

*Primary Examiner* — Daniel C. McCracken
(74) *Attorney, Agent, or Firm* — Oblon, Spivak, McClelland, Maier & Neustadt, L.L.P.

(57) ABSTRACT

The invention relates to a process for producing nanoparticulate solids by means of a Péclet number-stabilized gas-phase reaction.

15 Claims, 3 Drawing Sheets

Example of an apparatus for producing nanoparticles

Figure 1: Example of an apparatus for producing nanoparticles

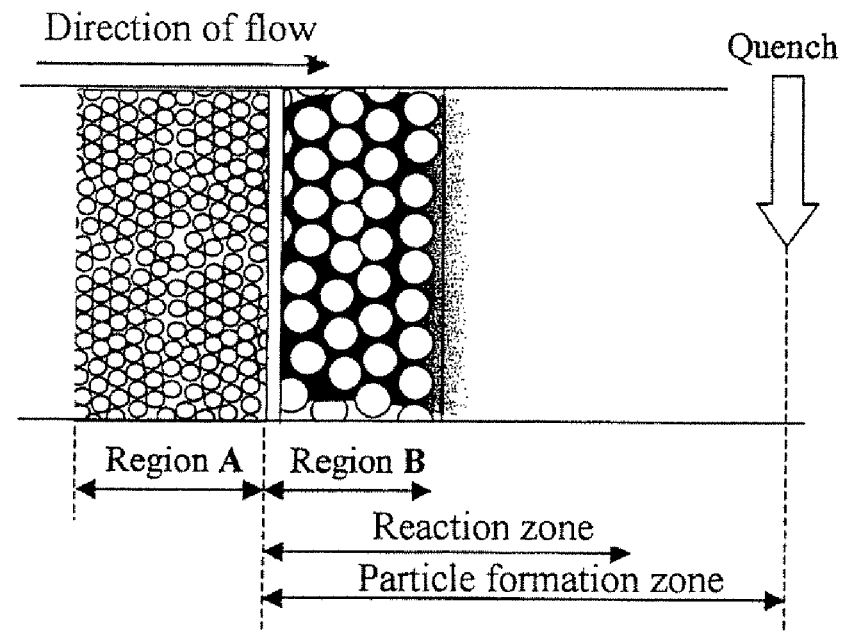
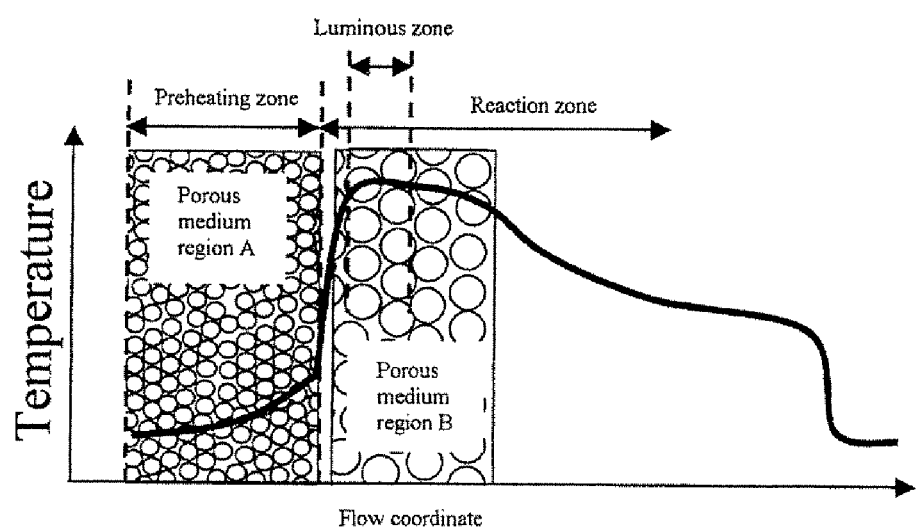
Figure 2

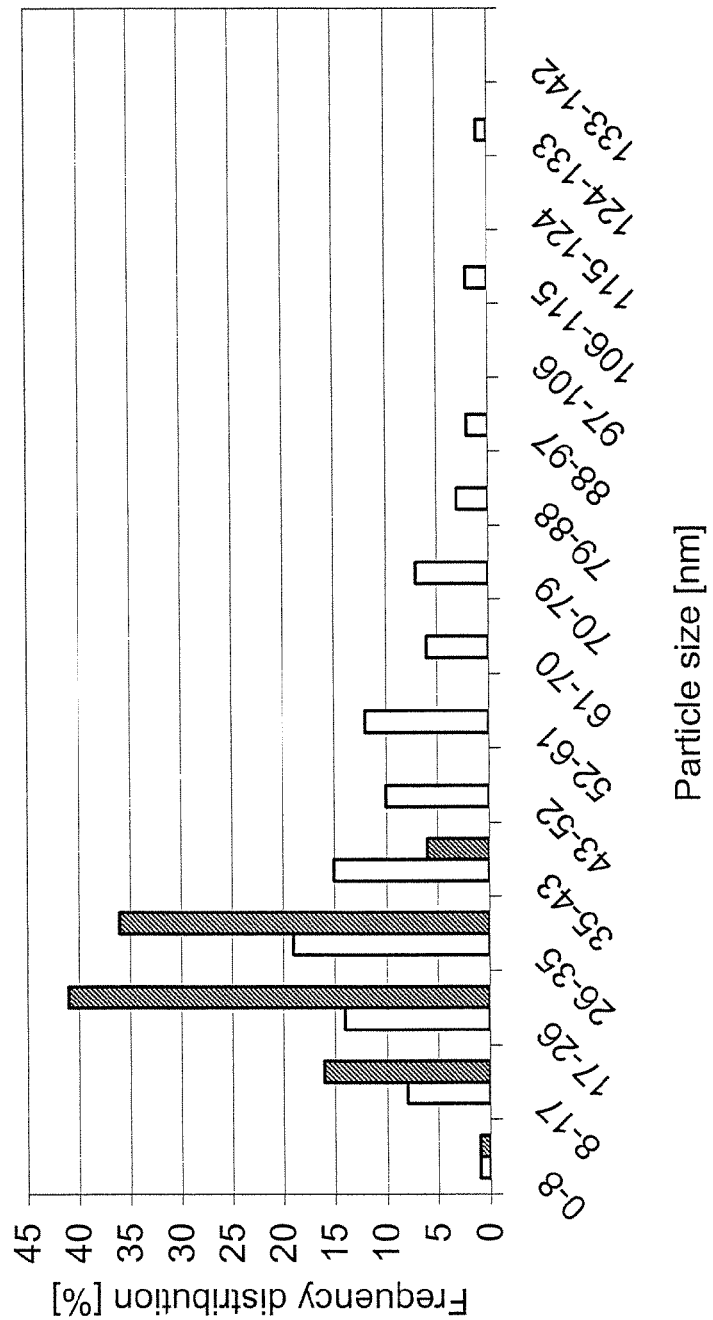
Figure 3: $Fe_2O_3$ Primary particle size distribution
Black: measurement with porous body
White: measurement without porous body

_US 8,119,097 B2_

METHOD FOR PRODUCING NANOPARTICULATE SOLID MATERIALS

REFERENCE TO RELATED APPLICATIONS

The present application is a 371 national stage application of PCT/EP06/50423, filed Jan. 24, 2006, the entire contents of each of which are hereby incorporated by reference. The present application also claims priority to European application EP05001910.8, filed Jan. 31, 2005, the entire contents of which are also hereby incorporated by reference.

DESCRIPTION

The invention relates to a process for producing nanoparticulate solids by means of a Péclet number-stabilized gas-phase reaction.

Nanoparticles are particles having a size in the order of nanometers. Their size is in the transition region between atomic or monomolecular systems and continuous macroscopic structures. Apart from their usually very large surface area, nanoparticles have particular physical and chemical properties which differ significantly from those of larger particles. Thus, nanoparticles have a lower melting point, absorb light only at shorter wavelengths and have mechanical, electrical and magnetic properties which are different from those of macroscopic particles of the same material. The use of nanoparticles as building blocks enables many of these particular properties to be utilized for macroscopic materials, too (Winnacker/Küchler, _Chemische Technik: Prozesse und Produkte_, (editors: R. Dittmayer, W. Keim, G. Kreysa, A. Oberholz), vol. 2: Neue Technologien, chapter 9, Wiley-VCH Verlag 2004).

Nanoparticles can be produced in the gas phase. Numerous processes for the gas-phase synthesis of nanoparticles are known in the literature, including processes in flame, plasma and hot-wall reactors, inert gas condensation processes, free jet systems and supercritical expansion (Winnacker/Küchler, see above).

To obtain nanoparticles having a very uniform size and morphology, it is advantageous, as is generally known to those skilled in the art, to stabilize the gas-phase reaction both in space and in time. This makes it possible to ensure that all starting particles are exposed to virtually identical conditions during the reaction and thus react to form uniform product particles. In contrast, in gas-phase reactions which are not stabilized in space or time, e.g. technical spray flames, the starting materials are subjected to very different thermal conditions, which lead to correspondingly more inhomogeneous products.

US 20040050207 describes the production of nanoparticles by means of a burner, with the starting materials being conveyed in a plurality of tubes to the reaction zone and being mixed and reacted only there. In a similar way, the preparation of aluminum nitride powder is described in US 20020047110 and the synthesis of optical glass powder is described in JP 61-031325.

DE 10243307 describes the synthesis of carbon nanoparticles. The gas-phase reaction is carried out between a porous body which serves to prevent flashing back of the flame and a baffle plate located above it. The feed gases are passed through the porous body into the reaction space and are reacted there.

A burner and a process for producing carbon nanoparticles in the gas phase is described in US 20030044342. Here, the feed gases are reacted outside a porous body.

EP 1004545 presents a process for the pyrogenic preparation of metal oxides, in which the reactants are conveyed through a shaped body having continuous channels and reacted in a reaction space. The reaction can also be initiated by radiation within the shaped body, but the reaction zone is generally completely outside the shaped body.

DE 19939951 discloses a process and a burner for preparing HCl and similar gaseous products using a porous body for reliable stabilization of the flame. A zone having relatively small pores in which the gas velocity is increased is proposed in order to prevent flashing back of the flame and the actual reaction then takes place within a second zone having larger pores. The production of nanoparticles is not described.

The use of porous structures, e.g. ceramics, as stabilizers in combustion reactions which serve for direct or indirect heating, for example of buildings or for provision of hot water, is known (K. Wawrzinek, VDI progress reports, series 3, No. 785, 2003). Here, very complete utilization of the chemical energy stored as heating value in the usually gaseous fuels is sought. The combustion conditions are basically oxidizing, i.e. an excess of oxygen is used, in order to ensure very complete combustion. As in EP 1004545, a porous structure serves, in a first variant, for uniform introduction of fuel and air, usually completely premixed, into a combustion zone located outside the structure. Stabilization is effected at low flow velocities and leads to an even flat flame made up of the individual flames resulting from the pores. Heat exchange between the flame zone and the surface of the structure results in a high temperature of the stabilizer body and correspondingly to preheating of the fuel-air mixture fed in. This results in the stabilizing properties of this burner design, which is also referred to as a ceramic surface burner. The good radiation properties of the ceramic surface result in high heat transfer rates via radiant heat, so that this burner is suitable for radiation heating, e.g. for large industrial hauls.

It is also known that the combustion of premixed gases can occur partly or completely within a porous structure. Thus, K. Pickenäcker describes, in her thesis at the University of Erlangen-Nuremberg, published in VDI progress reports, series 6, No. 445 (2000), low-emission gas heating systems based on stabilized combustion in porous media. Use of these porous burners for producing nanoparticulate solids is not described.

It was an object of the present invention to improve further the processes for producing nanoparticles. In particular, a process by means of which nanoparticulate solids which have a very uniform particle size as a result of a uniform temperature and residence time history can be produced in good yield should be provided. In addition, a process which is very variable and can also be scaled up, i.e. by means of which nanoparticulate solids of high quality can be produced safely and reliably from a wide variety of starting materials and under a wide variety of conditions, should be made available.

It has surprisingly been found that this object can be achieved by a process in which a suitable reaction mixture is subjected to a reaction which occurs at least partly within a porous medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a depiction of the particle formation zone of the present invention wherein particle formation and growth typically occur in the entire reaction zone and can also continue even after leaving the reaction zone until rapid cooling is effected.

FIG. 3 provides a graphical representation of a particle size distribution of $Fe_2O_3$ formed according to an embodiment of the present invention.

Figure 1:
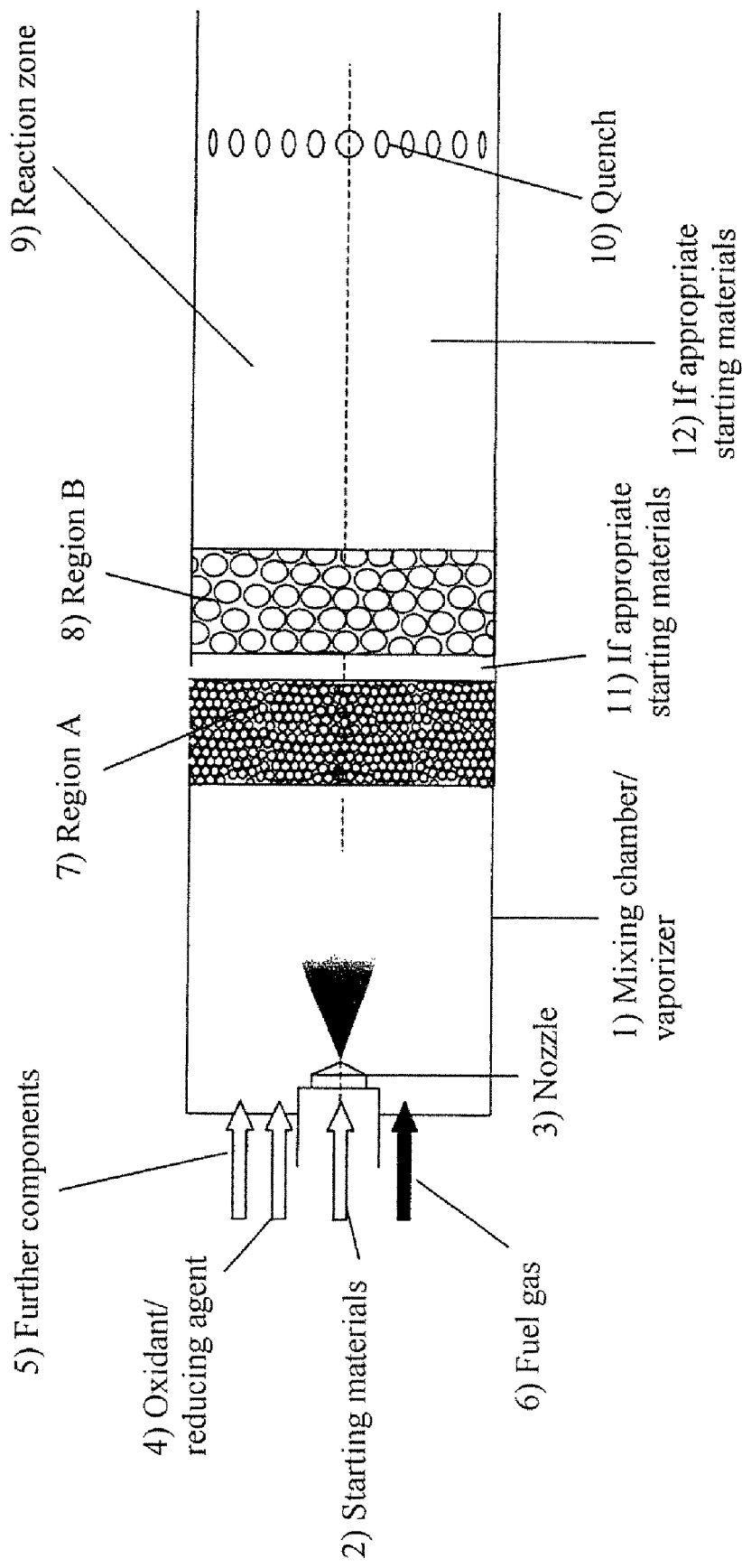
FIG. 1 shows an example of a suitable apparatus for carrying out the present invention.

The present invention accordingly provides a process for producing nanoparticulate solids by means of a Péclet number-stabilized gas-phase reaction, which comprises
a) providing a reaction gas,
b) passing the reaction gas through at least one reaction zone comprising a porous medium and subjecting it to a reaction which is stabilized by the medium and occurs at least partly in the interior of the porous medium, with nanoparticulate primary particles being formed,
c) subjecting the reaction product obtained in step b) to rapid cooling after the reaction and
d) isolating the nanoparticulate solids formed.

For the purposes of the present invention, stabilization of a reaction means stabilization both in space and in time. The induction (ignition) of the reaction occurs on entry of the reaction mixture into the reaction zone which is filled at least partly by a porous medium. Neither back-ignition into a region upstream of the reaction zone nor uncontrolled propagation of the reaction in the flow direction occur. In addition, reaction products whose material composition does not change significantly after leaving the reaction zone can be obtained over the entire duration of the reaction. The induction of the reaction is characterized by a sudden increase in the temperature of the reaction mixture provided within a spatially restricted region on entry into the reaction zone (see FIG. 2).

According to the invention, stabilization of the reaction occurs according to the concept of Péclet number stabilization. The Péclet number Pe is defined as the ratio of heat production by the reaction to heat removal by means of the thermal conductivity of the gas: $Pe=(s_l d)/a$ ($s_l$=laminar flame velocity, d=equivalent pore size, a=thermal conductivity of the gas mixture). In Péclet number-stabilization, use is made of a reactor which comprises at least two subzones, for example a first subzone (region A) and a second subzone (region B). The first subzone simultaneously serves as a flame barrier and as a preheating zone; in this subzone, the quantity of heat removed is greater than that which can be introduced or produced by prereactions. In the second subzone, appreciable heat transfer between solid phase and gas phase occurs, as a result of which the combustion is stabilized. The second subzone (region B) is part of the subsequent downstream reaction zone. According to the invention, the luminous zone within this second subzone serves as the site of the greatest reaction density and in general also has the highest temperature (cf. R. Günther, *Verbrennungen und Feuerungen*, pp. 67-73, Springer-Verlag 1974). The first subzone (region A) can be part of a porous medium, e.g. in the form of a first submedium having a first pore size which is smaller than that of the second submedium (second subzone, region B). The first subzone can also be realized hydrodynamically, e.g. by means of a tube of suitable cross section through which flow occurs at a sufficiently high velocity. The second subzone comprises a porous medium within which all of the luminous zone is located. The reaction zone can be located completely within the porous medium or can extend beyond the porous medium. At any point in a reactor (preheating zone, luminous zone, reaction zone), the Péclet number Pe indicates whether stable combustion takes place. The Péclet number in the first subzone (region A) is preferably below 50. Suitable Péclet numbers for the reaction zone are, in the absence of a catalyst, for example in the range from 50 to 70.

According to the invention, the reaction of the reaction gas takes place in a reactor which comprises at least one porous medium and occurs at least partly in the interior of the porous medium. In all cases, the luminous zone is located within the porous medium (region B). The induction of the reaction generally occurs in the interior of the porous medium (region B). In rare cases, the induction can also commence in the region A.

In a useful embodiment, the reaction zone can extend downstream beyond the porous medium. The flame occurring in this region is characterized by macroscopic heat transport but essentially no macroscopic mass transport counter to the flow direction. In this embodiment, it is possible for the longitudinal extension of the porous medium to be small compared to the total reaction zone and the length of the porous medium to be, for example, not more than 90%, preferably not more than 50%, in particular not more than 20%, based on the total length of the reaction zone.

The porous medium preferably has a pore volume of at least 40%, preferably at least 75%, based on the total volume of the medium.

Materials suitable as porous media are, for example, customary packing elements such as Raschig rings, saddle bodies, Pall® rings, wire spirals or wire mesh rings which can be made of various materials and are suitable for coating with a catalytically active component. The packing elements can be introduced in a suitable embodiment as a loose bed into the reaction zone.

According to the invention, shaped bodies which can be installed simply in the reactor as a result of their shape can be used as porous media. These have, owing to their pore volume, a high specific surface area. Such shaped bodies will hereinafter also be referred to as monoliths. The shaped bodies or monoliths can be constructed from, for example, woven meshes, knitted meshes, foils, expanded metal, honeycomb structures and/or metal sheets. Preference is given to monoliths. These can comprise, for example, ceramic.

Particular preference is given to using porous media in the form of ceramic foams.

Suitable woven meshes are, for example, made of fibers of the oxidic materials mentioned below, e.g. $Al_2O_3$ and/or $SiO_2$, or of weavable metal wires. Woven meshes of various types of weave can be produced from the wires and fibers mentioned, e.g. plain weaves, twirls, braids and other special weaves. These woven meshes can be combined into multilayer mesh composites.

According to the invention, it is also possible to use porous shaped bodies which are made up of a plurality of layers of corrugated, creased and/or smooth woven meshes, with the layers being arranged so that they do not give an increased resistance to flow. Monoliths in which the woven meshes are partly or completely replaced by metal sheets, knitted meshes or expanded metal can likewise be used, In addition, it is possible for the porous medium to be made up of different materials. For example, the porous medium can be made up of layers, i.e. 2 or more layers, with each of the layers comprising a different material. It is in this way possible to realize porous media having decreasing or increasing pore sizes or pore size gradients.

Suitable materials for the porous media are, for example, oxidic materials such as $Al_2O_3$, $ZrO_2$ and/or $SiO_2$. Further suitable materials are SiC materials. Heat-resistant metallic materials, for example materials comprising iron, spring steel, Monel metal, chromium steel, chromium-nickel steel, titanium, CrNiTi steels and CrNiMo steels or heat-resistant steels having the material numbers 1.4016, 1.4767, 1.4401, 2.4610, 1.4765, 1.4847, 1.4301, 1.4742, are also suitable. Very particular preference is given to bodies comprising $Al_2O_3$, $ZrO_2$, $SiO_2$, SiC, carbon-reinforced SiC or SiC comprising silicon binders as porous media.

The porous media can additionally comprise at least one catalytically active component in the region B. This is preferably present on the surface of the abovementioned porous media. Coating of the catalyst supports with the catalytically active component is carried out by the methods customary for this, e.g. impregnation and subsequent calcination. As catalytically active components, it is possible to use, in particular, the metals Rh, Pd, Pt, Ru, Fe, Ni, Co, Cu or V and mixtures of the metals.

The reaction zone is preferably configured as a system having low backmixing. This preferably has essentially no macroscopic mass transport counter to the flow direction.

The gas-phase reaction carried out by the process of the invention can in principle be any chemical reaction which leads to formation of nanoparticulate solids. Preferred embodiments are oxidation, reduction, pyrolysis and hydrolysis reactions. Furthermore, the reaction can be either an allothermic process in which the energy required for the reaction is introduced from the outside or an autothermal process in which the required energy results from partial reaction of a starting material.

Typical products which can be obtained as nanoparticulate solids by the process of the invention are carbon black, oxides of at least one of the elements Si, Al, Ti, In, Zn, Ce, Fe, Nb, Zr, Sn, Cr, Mn, Co, Ni, Cu, Ag, Au, Pt, Pd, Rh, Ru, Bi, Ba, B, Y, V, also hydrides of at least one of the elements Li, Na, K, Rb, Cs, in addition sulfides such as $MoS_2$, carbides, nitrides and also elemental metals or semimetals such as Li, Na, In, Sn, Ge, P, As, Sb and also mixtures thereof.

The particle size of the nanoparticulate solids produced by the process of the invention is usually in the range from 1 to 500 nm, preferably from 2 to 100 nm. The nanoparticulate solids produced by the process of the invention have a particle size distribution whose standard deviation a is less than 1.5.

The process of the invention makes it possible to produce nanoparticulate solids from many different starting materials and possible further components. Suitable process variants for obtaining at least one of the abovementioned products are described in more detail below.

The gas-phase reaction can be controlled via, apart from further parameters, the following parameters:
  composition of the reaction gas (type and amount of starting materials, additional components, inert constituents) and
  reaction conditions in the reaction (reaction temperature, residence time, introduction of the starting materials into the reaction zone, presence of catalysts).

The process of the invention for producing nanoparticulate solids can be divided into the following substeps, which are described in more detail below.

Step a)

To carry out the reaction, a reaction gas which can comprise as constituents at least one starting material and possibly one or more further components is provided.

Here, the reaction gas provided in step a) comprises at least one starting material which can preferably be brought into the gas phase so that it is present in gaseous form under the reaction conditions and can be converted by means of a chemical reaction into a nanoparticulate solid. Depending on the desired product, the starting material can be an element-hydrogen compound, for example a hydrocarbon, a borane, a phosphine or a metal hydride, or a metal carbonyl, metal alkyl, metal halide such as a fluoride, chloride, bromide or iodide, metal sulfate, metal nitrate, metal-olefin complex, metal alkoxide, metal formate, metal acetate, metal oxalate or metal acetylacetonate.

The reaction gas can comprise an oxidant, for example molecular oxygen, an oxygen-comprising gas mixture, oxygen-comprising compounds and mixtures thereof, as further component. In a preferred embodiment, molecular oxygen is used as oxygen source. This makes it possible to keep the content of inert compounds in the reaction gas low. However, it is also possible to use air or air/oxygen mixtures as oxygen source. Oxygen-comprising compounds used are, for example, water, preferably in the form of water vapor, and/or carbon dioxide. When carbon dioxide is used, this can be recycled carbon dioxide from the gaseous reaction product obtained in the reaction.

In a further embodiment, the reaction gas can comprise a reducing agent selected from among molecular hydrogen, ammonia, hydrazine, methane, hydrogen-comprising gas mixtures, hydrogen-comprising compounds and mixtures thereof as further component.

Furthermore, the reaction gas can comprise a fuel gas which provides the energy required for the reaction as further component. This can be an $H_2/O_2$ gas mixture, an $H_2$/air mixture, a mixture of methane, ethane, propane, butanes, ethylene or acetylene with air or another oxygen-comprising gas mixture.

The reaction gas used in the process of the invention can comprise not only the abovementioned constituents, which can be present either individually or together, but in addition at least one further component. Such components include, for example, any recirculated gaseous reaction products, crude synthesis gas, CO, $CO_2$ and also further gases for influencing the yield and/or selectivity of particular products, e.g. hydrogen or inert gases such as nitrogen or noble gases. Furthermore, finely divided solids can also be introduced as aerosols. These solids can be, for example, solids whose particle sizes are in the same range as the nanoparticulate solids obtainable by means of the process of the invention and which are to be subjected to the process for the purposes of modification, after-treatment or coating.

If the reaction gas used in step a) comprises more than one constituent, these constituents are preferably at least partly mixed with one another before their reaction. A distinction is here made between the following types of mixing:

Macroscopic mixing: the transport of the material is effected by means of large eddies (distributive mixing) and by formation of fine structures as a result of cascades of eddies (dispersive mixing). In the case of laminar flow, macroscopic mixing takes place by means of laminar folding which is brought about in the process of the invention by the porous medium or other internals (laminar mixing). In the case of macroscopic mixing, mixing occurs essentially by means of inertial forces and convection.

Mesoscopic mixing: the smallest eddies roll up layers of different concentrations of specie (engulfment). As a result of stretching of the eddies, the thickness of the individual laminar layers is reduced (deformation). In the case of mesoscopic mixing, mixing occurs essentially by convection and viscous forces.

Microscopic mixing: on this finest length scale, mixing occurs exclusively by molecular diffusion.

In the process of the invention, the starting components are preferably at least macroscopically mixed before their reaction commences.

For the purposes of the present invention, "provision" means that the reaction gas intended for the reaction is produced or stored in a suitable apparatus from which it can be fed to the reaction zone. Apparatuses suitable for this purpose are known per se to those skilled in the art.

Step b)

Step b) of the process of the invention in principle comprises the following individual steps: if appropriate preheating of at least one constituent of the reaction gas, if appropriate mixing of at least one part of the constituents, induction of the reaction, reaction. Induction of the reaction and reaction generally go directly over into one another.

Before the reaction, the constituents forming the reaction gas can be partly or entirely premixed. In a preferred embodiment, homogeneous mixing of the constituents is effected before the reaction. This premixing can, as described above, be effected by macroscopic mixing which is, for example, brought about by means of a porous medium or other internals such as static mixers.

Before, during or after premixing or instead of premixing, part of the constituents or all constituents of the reaction gas can be preheated. Liquid components are preferably vaporized prior to the reaction.

On passing through the reaction zone, the reaction gas is heated to a temperature of preferably not more than 1800° C. This can be effected by introduction of energy and/or an exothermic reaction of the reaction gas. According to the invention, the reaction occurs at least partly in the interior of the porous medium of region B, with the luminous zone always being within the porous medium. Induction can, for example, be effected by means of appropriately strong external heating of the porous medium at the beginning of the reaction zone. Induction can also be effected by means of an ignition burner which is integrated into the porous medium or located between regions A and B. In addition, induction can be effected by brief introduction of a catalyst into the induction zone.

In the case of induction of the reaction in the presence of a catalyst, a distinction is made between one-off induction by means of a catalyst which is introduced for this purpose and is removed again after induction and continual induction by means of a catalyst which is permanently present in the porous medium. Preference is given to neither induction nor the reaction being carried out in the presence of a catalyst.

The induction of the reaction is followed by the reaction in the reaction zone. The reaction zone can, as indicated above, be located completely within the porous medium or can extend downstream beyond the porous medium. In both cases, the reaction zone is characterized by macroscopic heat transport but essentially no macroscopic mass transport counter to the direction of flow. Essentially no temperature gradient perpendicular to the direction of flow is present within the reaction zone.

According to the invention, nucleation is followed during the course of the reaction firstly by formation of nanoparticulate primary particles which can be subject to further particle growth by means of coagulation and coalescence processes. Particle formation and growth typically occur in the entire reaction zone and can also continue even after leaving the reaction zone until rapid cooling is effected (see FIG. 2, particle formation zone). If more than one solid product is formed during the reaction, the different primary particles formed can also agglomerate with one another, forming nanoparticulate product mixtures. If the formation of a plurality of different materials occurs at different times during the reaction, core-shell products in which the primary particles of a product formed first are surrounded by layers of one or more other products can also be formed. In a further embodiment, solid is added separately into the reaction zone. These agglomeration processes can be controlled via the composition of the reaction gas and the reaction conditions and also by means of the type and time of the cooling of the reaction product described in step c).

The reaction in step b) preferably occurs at a temperature in the range from 600 to 1800° C., preferably from 800 to 1500° C.

The residence time of the reaction mixture in the reaction zone is preferably from 0.002 s to 2 s, particularly preferably from 0.005 s to 0.2 s.

The reaction to produce the nanoparticulate solids according to the invention can be carried out at any pressure, preferably in the range from 0.05 bar to 5 bar, in particular at atmospheric pressure, in the process of the invention.

Suitable apparatuses by means of which the process of the invention can be carried out are known per se to those skilled in the art. FIG. 1 shows an example of a suitable apparatus. This comprises the following parts:

1. Vaporizer/mixing chamber
2. Starting materials addition
3. Nozzle
4. Oxidant/reducing agent addition
5. Addition of further components
6. Fuel gas addition
7. Flame barrier (region A)
8. Porous medium (region B)
9. Reaction zone
10. Quenching gas addition
11., 12. If appropriate, further starting materials addition.

Furthermore, the reaction in step b) can advantageously be carried out using a pore burner as described in the thesis by K. Pickenäcker, University of Erlangen-Nuremberg, VDI progress reports, series 6, No. 445 (2000), which is hereby fully incorporated by reference.

Step c)

The reaction of the reaction gas in step b) is, according to the invention, followed by rapid cooling of the resulting reaction product in step c). This can be effected by direct cooling, indirect cooling, expansion cooling or a combination of direct and indirect cooling. In the case of direct cooling (quenching), a coolant is brought into direct contact with the hot reaction product in order to cool the latter. In the case of indirect cooling, heat energy is withdrawn from the reaction product without it coming into direct contact with a coolant. Preference is given to indirect cooling since this generally makes effective utilization of the heat energy transferred to the coolant possible. For this purpose, the reaction product can be brought into contact with the exchange surfaces of a suitable heat exchanger. The heat coolant can, for example, be used for heating the starting materials in the process of the invention or in a different endothermic process. Furthermore, the heat withdrawn from the reaction product can, for example, also be used for operating a steam generator. It is also possible to use a combination of direct cooling (prequench) and indirect cooling, with the reaction product obtained in step c) preferably being cooled to a temperature of less than 1000° C. by direct cooling (prequench). Direct cooling can, for example, be carried out by introduction of quenching oil, water, steam or cold recycle gases. In a further embodiment, it is possible to use an annular gap burner which makes very high uniform quenching rates possible and is known per se to those skilled in the art.

Step d)

To work up the reaction product obtained in step c), it can be subjected to at least one separation and/or purification step d). Here, the nanoparticulate solids formed are isolated from the remaining constituents of the reaction product. Preference is given to using filters or cyclones for this purpose. Furthermore, the nanoparticulate solids formed can also be isolated by means of dry or wet electroprecipitation.

The process of the invention is thus suitable for the continuous production of nanoparticulate solids under essentially steady-state conditions. Important features of this process are rapid introduction of energy at a high temperature level, generally short and uniform residence times under the reaction conditions and rapid cooling ("quenching") of the reaction products in order to avoid agglomeration of the nanoparticulate primary particles formed or a reaction which goes too far. Undesirable interactions between the particles formed and the porous medium which must be expected were not observed.

The invention is illustrated by the following example.

EXAMPLE

A particle generator as described in FIG. 1 was used for producing nanoparticulate $Fe_2O_3$. For this purpose, an aqueous solution of iron(III) nitrate was reacted in a methane gas flame (methane-air mixture). The temperature within the reactor was set to 1000-1200° C. by means of a stream of inert gas. A ceramic flame barrier was present in region A of the reactor, and an SiC ceramic having 10 pores per inch$^2$ (ppi) was used in region B.

The mean primary particle diameter of the $Fe_2O_3$ particles formed was 24 nm in this experiment, with the particle diameter ranging from 7 to 42 nm. The standard deviation of the particle size distribution was $\sigma<1.4$ (see FIG. 3).

Operation of the particle generator without use of the porous medium in region B resulted, despite use of the flame barrier, in a nonuniform distribution of the flow velocities over the exit surface of the flame barrier. The primary particle size distribution of the $Fe_2O_3$ particles formed in this case displayed a mean primary particle diameter of 40 nm and a scattering of the particle diameters in the range from 8 to 130 nm (see FIG. 3). The standard deviation of the particle size distribution in this case was $\sigma>1.8$.

The invention claimed is:

1. A process for producing nanoparticulate solids by means of a Péclet number-stabilized gas-phase reaction, which comprises
    a) providing a reaction gas,
    b) passing the reaction gas through at least one reaction zone comprising a porous medium and subjecting it to a reaction which is stabilized by the medium and in which nanoparticulate primary particles are formed, with a luminous zone being present completely within the porous medium, wherein the reaction zone is located completely within the porous medium,
    c) subjecting the reaction product obtained in step b) to rapid cooling and
    d) isolating the nanoparticulate solids formed.

2. The process according to claim 1, wherein essentially no temperature gradient perpendicular to the direction of flow occurs in the reaction zone.

3. The process according to claim 1, wherein the porous medium comprises ceramic material.

4. The process according to claim 1, wherein the pore volume of the porous medium is at least 40%, based on the total pore volume of the medium.

5. The process according to claim 1, wherein the particle size of the nanoparticulate solids is in the range from 1 to 500 nm and its particle size distribution has a standard deviation $\sigma$ of less than 1.5.

6. The process according to claim 1, wherein the residence time of the starting mixture in the reaction zone is from 0.005 s to 2 s.

7. The process according to claim 1, wherein the gas-phase reaction proceeds at atmospheric pressure.

8. The process according to claim 1, wherein the porous medium comprises at least one catalytically active metal.

9. A process for producing nanoparticulate solids by means of a Péclet number-stabilized gas-phase reaction, which comprises
    a) providing a reaction gas,
    b) passing the reaction gas through at least one reaction zone comprising a porous medium which comprises at least one catalytically active metal, and subjecting it to a reaction which is stabilized by the medium and occurs at least partly in the interior of the porous medium and in which nanoparticulate primary particles are formed, with a luminous zone being present completely within the porous medium,
    c) subjecting the reaction product obtained in step b) to rapid cooling and
    d) isolating the nanoparticulate solids formed.

10. The process according to claim 9, wherein essentially no temperature gradient perpendicular to the direction of flow occurs in the reaction zone.

11. The process according to claim 9, wherein the porous medium comprises ceramic material.

12. The process according to claim 9, wherein the pore volume of the porous medium is at least 40%, based on the total pore volume of the medium.

13. The process according to claim 9, wherein the particle size of the nanoparticulate solids is in the range from 1 to 500 nm and its particle size distribution has a standard deviation $\sigma$ of less than 1.5.

14. The process according to claim 9, wherein the residence time of the starting mixture in the reaction zone is from 0.005 s to 2 s.

15. The process according to claim 9, wherein the gas-phase reaction proceeds at atmospheric pressure.

* * * * *